Feb. 1, 1966

A. T. BROWNE ETAL 3,232,448

ROTATING LIFT

Filed Sept. 9, 1963

INVENTORS
Andrew T. Brown
August Henry Schwab
BY Connolly and Hutz
ATTORNEYS

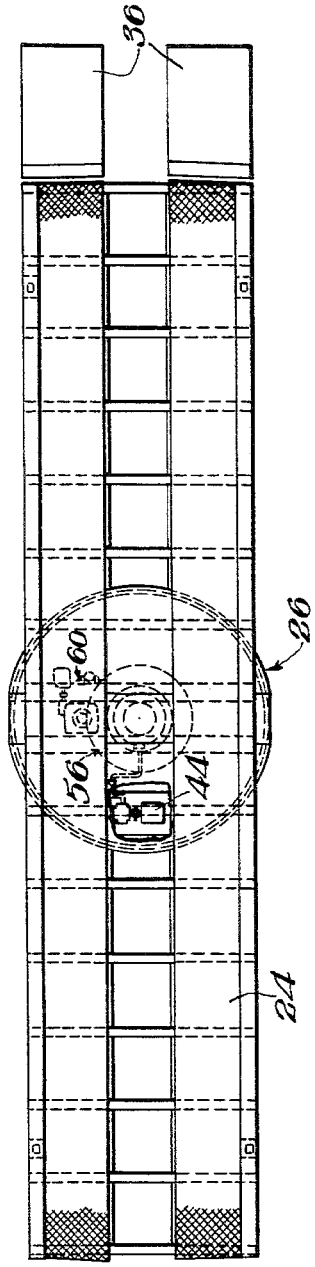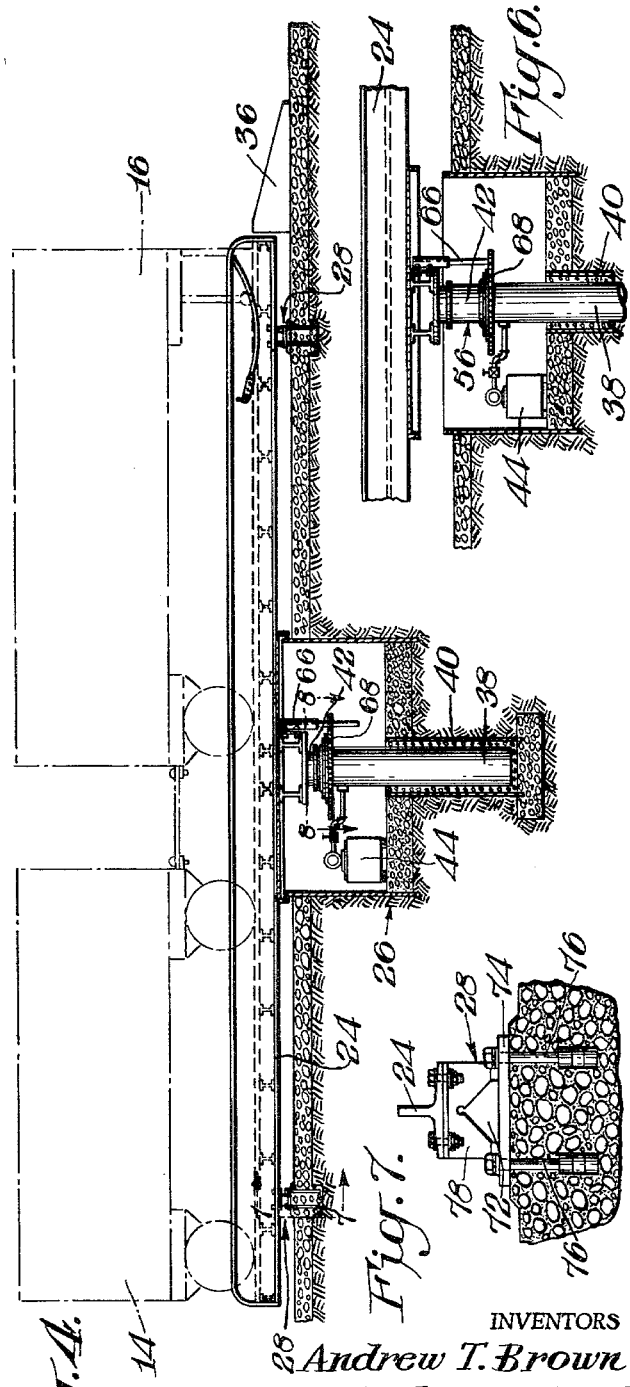
INVENTORS
Andrew T. Brown
August Henry Schwab
BY Connolly and Hutz
ATTORNEYS

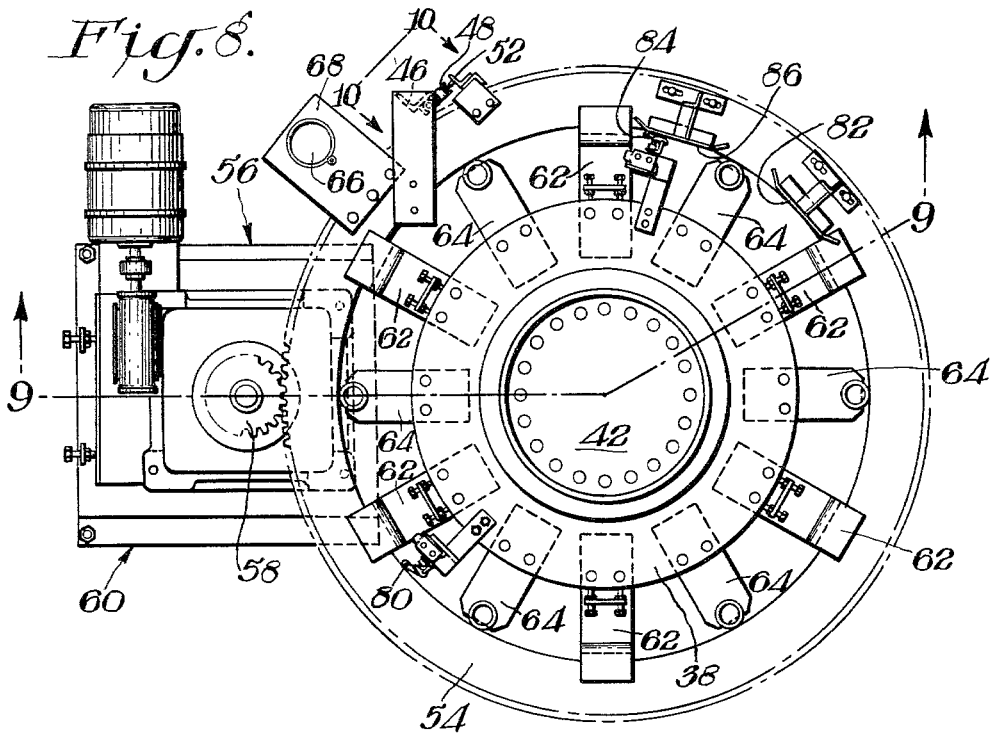
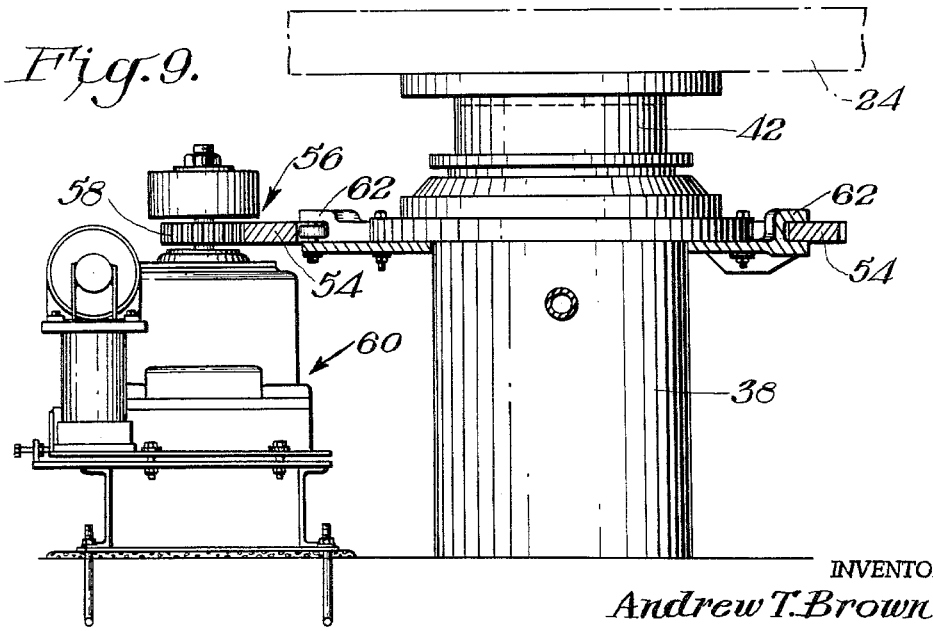

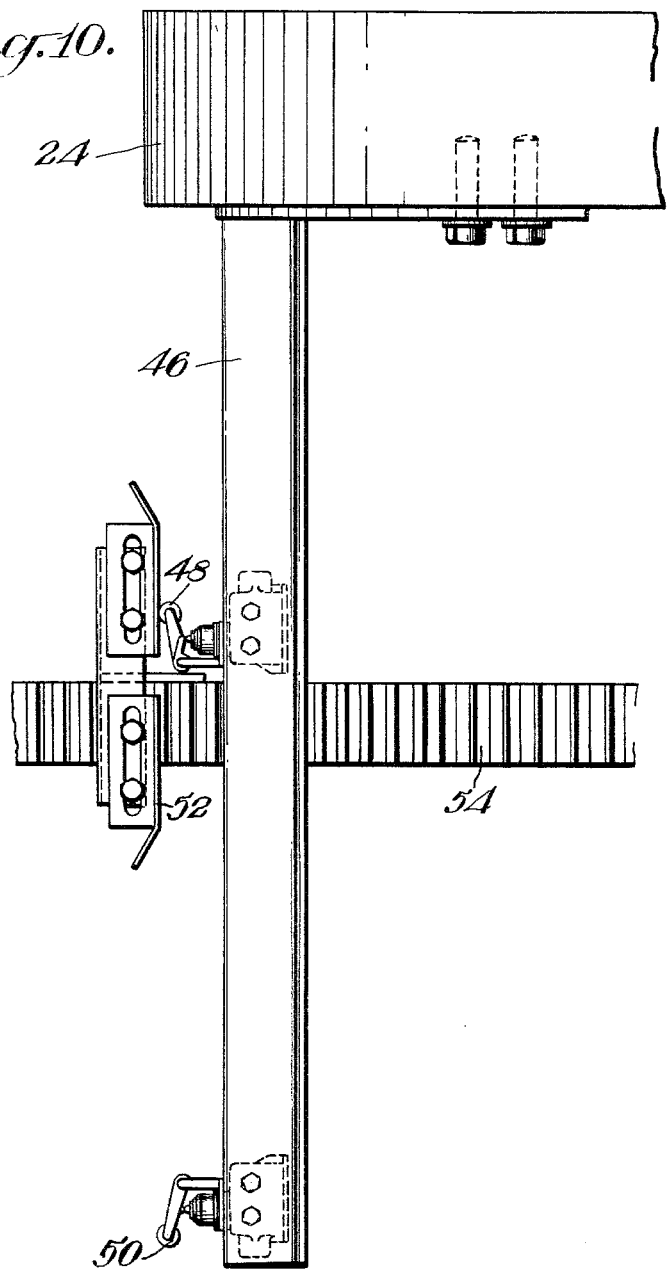

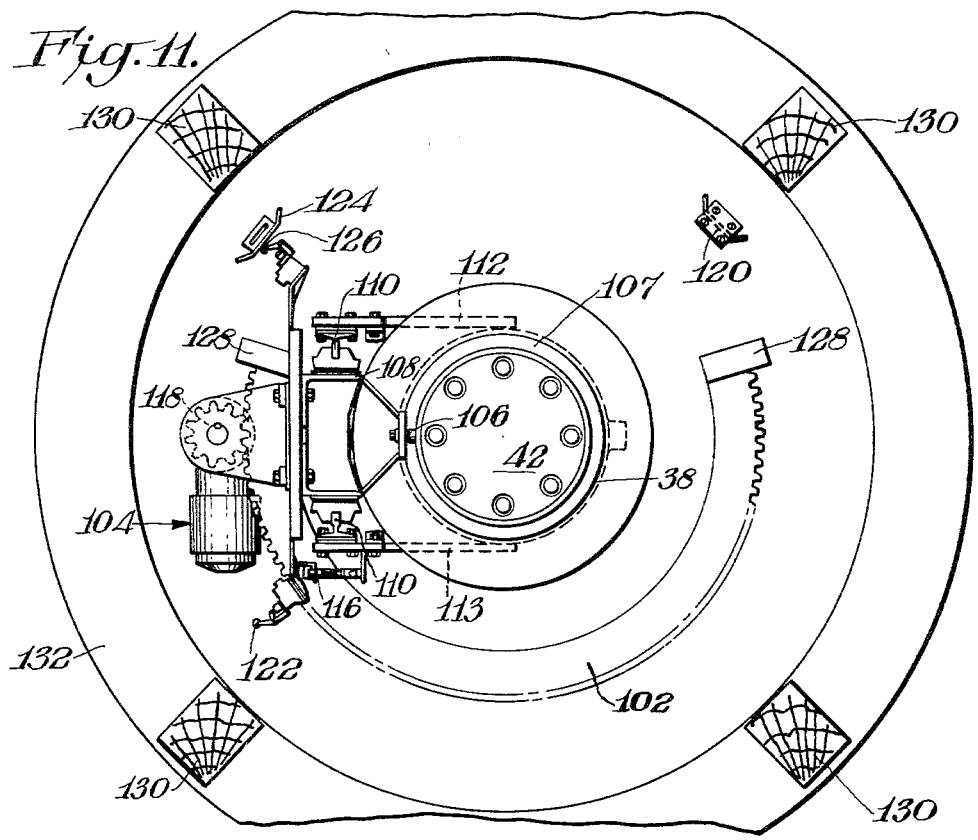
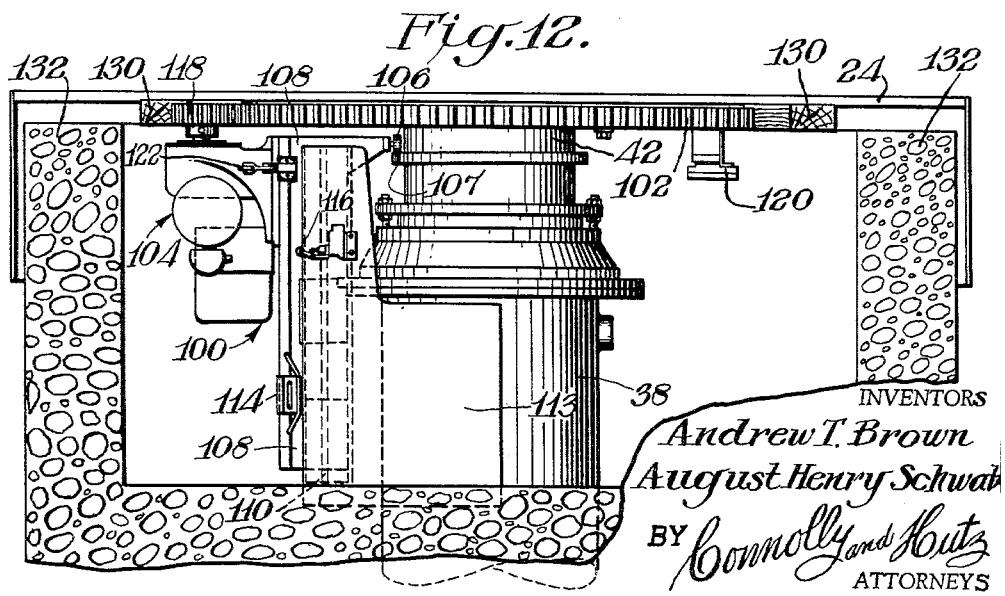

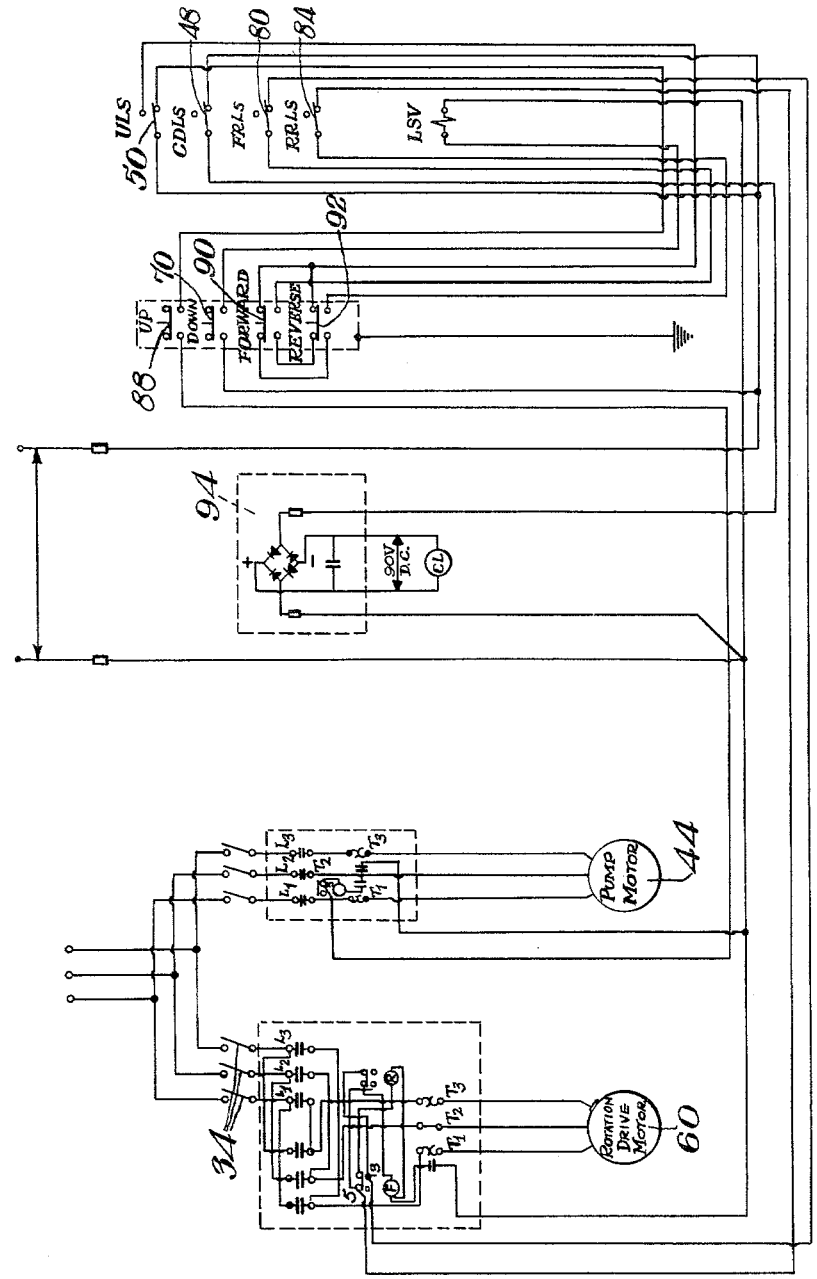

United States Patent Office 3,232,448
Patented Feb. 1, 1966

1

3,232,448
ROTATING LIFT
Andrew T. Browne, Springfield, and August Henry Schwab, Oreland, Pa., assignors to Globe Hoist Company, a corporation of Pennsylvania
Filed Sept. 9, 1963, Ser. No. 312,247
15 Claims. (Cl. 214—1)

This invention relates to a rotating lift for orienting a directional apparatus, and more particularly to such a lift for orienting radar equipment for ground controlled aircraft approach.

Radar equipment is used on airfields for ground controlled aircraft approach under conditions requiring instrument control. The radar equipment is aligned relative to runways and wind direction, and in bad weather with disturbed air, frequent changes are necessary. Since the equipment is very expensive, the same equipment is usually used for different positions by being placed in vans which are attached to trailers and driven to the various positions. Such orienting methods are not only expensive and complicated but are additionally undesirable since they require a large area of operation.

An object of this invention is to provide a simple and inexpensive rotating lift for orienting an apparatus such as radar equipment.

Another object of this invention is to provide such a rotating lift which requires only a limited area of operation.

In accordance with this invention, the radar equipment is mounted on a rotating piston and superstructure assembly. When it is necessary to change the orientation of the equipment, the assembly is raised a sufficient distance above its supports to clear snow or other ground obstacles, is rotated to the new position, and is lowered for operation. A moving connection in the rotation generator maintains it engaged with the assembly when it is raised, while controls stop the rotation at preselected angular orientations.

In an advantageous form of this invention, the rotation generator is a geared transmission mounted on the cylinder and connected to the assembly when it is raised by a pin sliding in a sleeve. When the assembly is lowered, the driven gears of the geared transmission may be disengaged from its drive unit and the radar equipment is precisely positioned by supports on the ground without having drive back through the drive unit.

In an alternative form of this invention, the rotation generator comprises a geared transmission mounted on the piston and superstructure assembly. The gearing drive unit moves up and down with the piston and superstructure assembly by its sliding connection with the cylinder. The vertical movement of the piston and superstructure assembly may be transmitted to the drive unit by means of a cam follower on the drive unit carriage engaging the piston and superstructure assembly to vertically slide the carriage in rails on the cylinder.

Novel features and advantages of the present invention will become apparent to one skilled in the art from a reading of the following description in conjunction with the accompanying drawings wherein similar reference characters refer to similar parts and in which:

FIG. 3 is a top plan view of the rotating lift shown in FIG. 1;

FIG. 4 is a side view in elevation of the rotating lift shown in FIG. 3 with the directional apparatus mounted on the superstructure;

2

Figure 5:
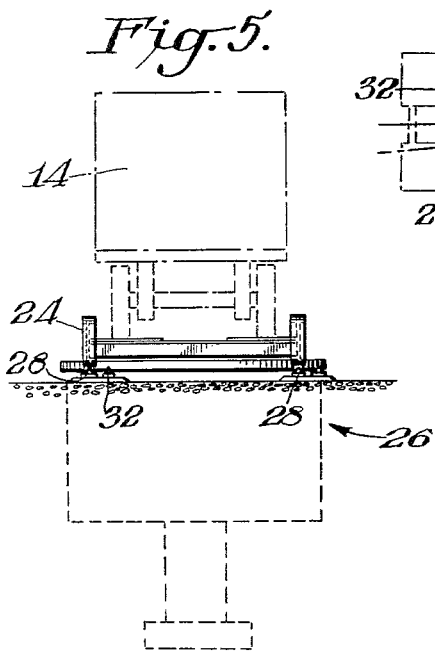

FIG. 5 is an end view in elevation of the rotating lift shown in FIG. 4;

FIG. 6 is a side view in elevation of a portion of the rotating lift shown in FIG. 4 in a different phase of operation;

FIG. 7 is a cross-sectional view in elevation taken through FIG. 4 along the line 7—7;

FIG. 8 is a cross-sectional plan view taken through FIG. 4 along the line 8—8;

FIG. 9 is a cross-sectional view in elevation taken through FIG. 8 along the line 9—9;

FIG. 10 is a cross-sectional view in elevation taken through FIG. 8 along the line 10—10;

FIG. 11 is a top plane view of an alternative form of the invention shown in FIGS. 1–10;

FIG. 12 is a side view in elevation of the rotating lift shown in FIG. 11; and

FIG. 13 is a wiring diagram used in the embodiment of the invention shown in FIGS. 1–10.

Figure 1:
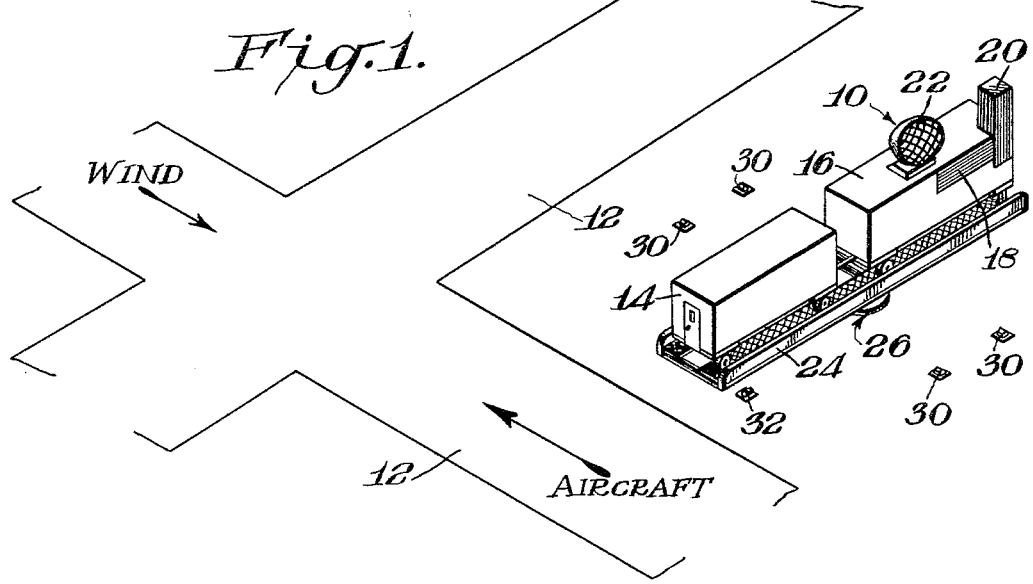
FIG. 1 is a perspective view of the rotating lift of one embodiment of this invention.

As shown in FIG. 1, the directional apparatus such as radar equipment 10 is placed in vans aligned relative to the runway 12 and wind direction. Van 14 houses, for example, the generator and air conditioning equipment while van 16 houses the horizontal radar antenna 18, vertical radar antenna 20 and the rotating radar antenna 22. Equipment 10 is mounted on a superstructure or bolster 24 secured to rotating lift 26. When it is necessary to change the angular orientation of equipment 10, superstructure 24 is raised a sufficient distance above its supports 28 to clear snow or other ground obstacles, is rotated to its new position and then lowered for operation.

Figure 2:
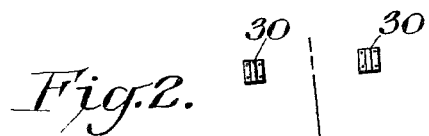
FIG. 2 is a diagrammatical view of the angular positions of the rotating lifts shown in FIG. 1.

As shown in FIG. 2, superstructure 24 is moved to three preselected angular orientations. When in its first operating position, the superstructure is mounted on supports 28. In the intermediate operating position, superstructure 24 rests on supports 30 and in its final operation position, superstructure 24 rests on supports 30 and in its final operating position, for example, 185° from its original position, superstructure 24 rests on supports 32. The rotation of superstructure 24 is controlled by manual control switches 34 shown in FIG. 13. Ramps 36 are positioned at the edge of the rotational path of movement of superstructure 24 to facilitate the loading and unloading of the vans.

As shown in FIG. 4, rotating lift 26 comprises cylinder 38 mounted in a casing 40 below the ground level. Piston 42 is reciprocally driven in cylinder 38 by elevation means or pump unit 44. Superstructure or bolster 24 is secured to the top of piston 42 so that the reciprocal motion of the piston is transmitted to superstructure 24. Secured to the base of superstructure 24, as shown in FIG. 10, is a bracket 46 carrying disengaging switch 48 later described in detail and upper limit switch 50. When superstructure 24 is raised a sufficient distance such as twelve inches, upper limit switch 50 contacts cam and bracket assembly 52 on ring gear 54 to shut off pump unit 44 and hold superstructure 24 in this elevated position. The operator then depresses one of control buttons 34 (shown in FIG. 13) to begin operation of rotation generator 56. As shown in FIGS. 8 and 9, rotation generator 56 comprises ring gear 54 mounted on cylinder 38 and driven by pinion 58 from drive unit 60. A plurality of double flanged guide brackets 62 are mounted on cylinder 38 and ring gear 54 is positioned between the flanges and thus maintained in a horizontal plane. Roller brackets 64 also mounted on cylinder 38 contact the inner surface of ring gear 54 to maintain it concentric with cylinder 38. Rotation generator 56 is maintained in engagement with the piston and superstructure assembly by a sliding connection comprising pin 66 secured to the base of superstructure 24, as shown in FIGS. 4 and 6, which slides in sleeve or bracket 68 on ring gear 54, as most clearly shown in FIG. 8. When the superstructure is rotated to the desired position, the operator lowers the superstructure by depressing control button 70 (shown in FIG. 13) to actuate pump unit 44. Before superstructure 24 is lowered to its operating position, disengaging switch 48 contacts cam and bracket assembly 52 to declutch or disengage pinion 58 from drive unit 60 so that the final accurate positioning of superstructure 24 is effected through mounting blocks 28, as later described in detail, without having to drive back through the reduction gear (not shown) of drive unit 60.

As shown in FIG. 7, support 28 comprises mounting block 72 secured to plate 74 and fixed to the ground by pins 76. The upper surface of mounting block 72 is sloped in the shape of an inverted V. Superstructure 24 carries a complementary shaped mounting block 78. As superstructure 24 is lowered to its final position, the sloping surfaces of mounting blocks 72 and 78 mate to accurately locate superstructure 24 in this predetermined angular orientation. The root of the V in mounting block 78 acts as a stop to hold the superstructure in this position.

As shown in FIG. 8, rotation generator 56 includes rotation limit means to prevent it from rotating beyond its extreme positions. The rotation limit means comprises a forward rotation limit switch 80 secured to cylinder 38 and positioned to contact cam and bracket assembly 82 on ring gear 54 when ring gear 54 has rotated for example 185° in the forward direction. Reverse rotation limit switch 84 on cylinder 38 is positioned to contact cam and bracket assembly 38 on ring gear 54 when the ring gear has rotated for example 185° in the reverse direction.

As shown in FIG. 13, a set of manual switches 34 connected to rotation drive unit 60 control the amount of rotation of ring gear 54 to stop the rotation at one of the three preselected positions. A second set of switches 88, 70, 90 and 92 permit the operator to control the vertical movement and the rotational direction of the piston and superstructure assembly. Magnetic clutch control 94 is connected to drive unit 60 and to disengaging switch 48 to disengage pinion 58 from drive unit 60 when disengaging limit switch 48 has been actuated.

FIGS. 11 and 12 show an alternative form of a rotation generator. Rotation generator 100 comprises a geared transmission 102 secured to the base of superstructure 24. The gearing drive unit 104 moves up and down with the piston and superstructure assembly by its sliding connection with cylinder 38. This vertical movement of the piston and superstructure assembly is transmitted to drive unit 104 through a cam follower 106 on the drive unit carriage 108 which rides on shoulder 107 of piston 42 to cause carriage 108 to vertically slide in rails 110 which are secured to braces 112 and 113 on cylinder 38. Elevator-type shoes (not shown) on carriage 108 take the reactions of the carriage as it slides on rails 110.

When it is necessary to change the angular orientation of superstructure 24, piston 42 is raised until cam and bracket assembly 114 on sliding carriage 108 contacts upper limit switch 116 secured to brace 113. Rotation generator drive unit 104 is then actuated by manual control buttons (not shown) so that pinion 118 rotates bull gear segment 102 to the desired angular orientation. Forward rotation limit cam and bracket assembly 120 mounted on bull gear segment 102 is positioned to contact forward rotation limit switch 122 mounted on sliding carriage 108 when the piston and superstructure assembly has rotated for example at 185° in the forward direction. Likewise, reverse rotation cam and switch bracket 124 on bull gear segment 102 is positioned to contact reverse rotation limit switch 126 on sliding carriage 108 when the piston and superstructure assembly has rotated, for example, 185° in the reverse direction. Additionally, positive stops 128 at each end of bull gear segment 102 provide a mechanical rotation limit means. When the superstructure and piston assembly is in its desired angular orientation, it is lowered onto V blocks, as previously described in detail, or onto concrete pedestals (not shown). A plurality of wood bumpers 130 are additionally disposed on the top of pit wall 132 to support superstructure 24 when it is lowered for operation.

What is claimed is:

1. A rotating lift for orienting a directional apparatus comprising a superstructure for supporting said apparatus, a cylinder, a rotating piston in said cylinder, said superstructure being mounted on said piston, elevation means connected to said piston for raising and lowering said piston and superstructure assembly, a rotation generator reacting between said cylinder and said piston and superstructure assembly to vary the angular orientation of said superstructure in a horizontal plane, a movable connection in said rotation generator to maintain it engaged with said piston and superstructure assembly when said assembly is raised, control means connected to said rotation generator for stopping its rotation at preselected angular orientations of said superstructure, support means for accurately positioning said superstructure in its operating position at said preselected angular orientations, said support means comprising a plurality of mounting blocks disposed under said superstructure, each of said mounting blocks having sloping upper surfaces, complementary sloping surfaces being on portions of said superstructure disposed to contact said mounting blocks when said superstructure is in said preselected positions whereby said complementary surfaces on said superstructure and on said mounting blocks are caused to mate when said superstructure is lowered at approximately said preselected positions to accurately locate it in said preselected positions, one said sloping surfaces being V-shaped with the root portion of said V-shaped surface comprising stop means to hold said superstructure in said preselected positions.

2. A rotating lift for orienting a directional apparatus comprising a superstructure for supporting said apparatus, a cylinder, a rotating piston in said cylinder, said superstructure being mounted on said piston, elevation means connected to said piston for raising and lowering said piston and superstructure assembly, a rotation generator reacting between said cylinder and said piston and superstructure assembly to vary the angular orientation of said superstructure in a horizontal plane, a movable connection in said rotation generator to maintain it engaged with said piston and superstructure assembly when said assembly is raised, control means connected to said rotation generator for stopping its rotation at preselected angular orientations of said superstructure, support means for accurately positioning said superstructure in its operating position at said preselected angular orientations, said rotation generator including gear means on said cylinder, a drive unit connected to said gear means for causing it to rotate, and said movable connection being attached to said gear means.

3. A rotating lift as set forth in claim 2 wherein said movable connection comprises a pin and sleeve on said gear means and on said piston and superstructure assembly, said pin being disposed to slide in said sleeve whereby said gear means is maintained engaged with said piston and superstructure assembly when it is raised.

4. A rotating lift as set forth in claim 2 wherein said gear means comprises a plurality of double flanged guide brackets on said cylinder, a ring gear disposed between the flanges of said guide brackets whereby said guide brackets maintain said ring gear in said horizontal plane, a plurality of roller brackets on said cylinder contacting the inner edge of said ring gear to maintain its concentric with said cylinder, and a pinion engaging said ring gear and connected to said drive unit.

5. A rotating lift as set forth in claim 2 wherein disengaging means are on said gear means and on said piston and superstructure assembly and are connected to said drive unit to disengage said gear means from said drive unit before said superstructure is lowered to said operating position, and said support means being arranged and disposed to accurately position said superstructure after said gear means is disengaged from said drive unit.

6. A rotating lift as set forth in claim 5 wherein said disengaging means includes an actuating member on one of said gear means and said piston and superstructure assembly, and a switch on the other of said gear means and said piston and superstructure assembly, said switch being connected to said drive unit; and said actuating member being disposed to contact said switch when said piston and superstructure assembly is lowered a preselected amount.

7. A rotating lift as set forth in claim 5 wherein said support means comprises a plurality of mounting blocks disposed under said superstructure, each of said mounting blocks having sloping upper surfaces, complementary sloping surfaces on portions of said superstructure disposed to contact said mounting blocks when said superstructure is in said preselected positions whereby said complementary surfaces on said superstructure and on said mounting blocks are caused to mate when said superstructure is lowered at approximately said preselected positions to accurately locate it in said preselected positions.

8. A rotating lift as set forth in claim 7 wherein one of said sloping surfaces is V-shaped, the root portion of said V-shaped surfaces comprising stop means to hold said superstructure in said preselected positions.

9. A rotating lift as set forth in claim 5 wherein upper limit cam and switch means are on said gear means and said piston and superstructure assembly and are connected to said drive means, said upper limit cam and switch means being disposed to contact each other when said piston and superstructure assembly is raised a preselected amount to stop the lifting of said superstructure.

10. A rotating lift for orienting a directional apparatus comprising a superstructure for supporting said apparatus, a cylinder, a rotating piston in said cylinder, said superstructure being mounted on said piston, elevation means connected to said piston for raising and lowering said piston and superstructure assembly, a rotation generator reacting between said cylinder and said piston and superstructure assembly to vary the angular orientation of said superstructure in a horizontal plane, a movable connection in said rotation generator to maintain it engaged with said piston and superstructure assembly when said piston and superstructure assembly is raised, control means connected to said rotation generator for stopping its rotation at preselected angular orientations of said superstructure, support means for accurately positioning said superstructure in its operating position at said preselected angular orientations, said rotation generator including gear means on said piston and superstructure assembly, a drive unit connected to said gear means for causing it to rotate, and said movable connection being attached to said drive unit.

11. A rotating lift as set forth in claim 10 wherein said movable connection comprises a carriage, said drive unit being mounted on said carriage, a follower on said carriage engaging said piston and superstructure assembly, rails on said cylinder, said carriage being disposed and arranged to slide on said rails whereby the vertical movement of said piston and superstructure assembly is transmitted to said follower to raise and lower said carriage.

12. A rotation generator as set forth in claim 11 wherein upper limit cam and switch means are on said carriage and cylinder and are connected to said piston drive means, said upper limit cam and switch means being disposed to contact each other when said carriage is raised a preselected amount to stop the lifting of said superstructure.

13. A rotating lift as set forth in claim 1 wherein rotation limit means are connected to said rotation generator to stop its rotation at preselected positions.

14. A rotating lift for orienting a directional apparatus comprising a superstructure for supporting said apparatus, a cylinder, a rotating piston in said cylinder, said superstructure being mounted on said piston, elevation means connected to said piston for raising and lowering said piston and superstructure assembly, a rotation generator reacting between said cylinder and said piston and superstructure assembly to vary the angular orientation of said superstructure in a horizontal plane, a movable connection in said rotation generator to maintain it engaged with said piston and superstructure assembly when said assembly is raised, control means connected to said rotation generator for stopping its rotation at preselected angular orientations of said superstructure, said rotation generator including gear means on said cylinder, a drive unit connected to said gear means for causing it to rotate, said movable connection comprising a pin and sleeve on said gear means and on said piston and superstructure assembly, and said pin being disposed to slide in said sleeve whereby said gear means is maintained engaged with said piston and superstructure assembly when it is raised.

15. A rotating lift for orienting a directional apparatus comprising a superstructure for supporting said apparatus, a cylinder, a rotating piston in said cylinder, said superstructure being mounted on said piston, elevation means connected to said piston for raising and lowering said piston and superstructure assembly, a rotation generator reacting between said cylinder and said piston and superstructure assembly to vary the angular orientation of said superstructure in a horizontal plane, a movable connection in said rotation generator to maintain it engaged with said piston and superstructure assembly when said assembly is raised, control means connected to said rotation generator for stopping its rotation at preselected angular orientations of said superstructure, said rotation generator including gear means on said poston and superstructure assembly, a drive unit connected to said gear means for causing it to rotate, said movable connection comprising a carriage, said drive unit being mounted on said carriage, a follower on said carriage engaging said piston and superstructure assembly, rails on said cylinder, and said carriage being disposed and arranged to slide on said rails whereby the vertical movement of said piston and superstructure assembly is transmitted to said follower to raise and lower said carriage.

References Cited by the Examiner

UNITED STATES PATENTS

| | | | |
|---|---|---|---|
| 1,552,326 | 9/1925 | Lunati | 104—44 X |
| 1,640,982 | 8/1927 | Cresci | 104—44 X |
| 2,044,031 | 6/1936 | Van Nieuland | 104—44 |
| 2,580,091 | 12/1951 | Hecker | 187—8.65 |
| 2,831,580 | 4/1958 | Carbone | 108—21 |

FOREIGN PATENTS 213,477  5/1941  Switzerland.

GERALD M. FORLENZA, *Primary Examiner.*

MARVIN A. CHAMPION, *Examiner.*